United States Patent [19]
Robison

[11] 3,854,884
[45] Dec. 17, 1974

[54] CLAUS PROCESS CONTROL SYSTEM

[75] Inventor: James Ray Robison, La Mirada, Calif.

[73] Assignee: International Telephone and Telegraph Corporation, New York, N.Y.

[22] Filed: Oct. 15, 1973

[21] Appl. No.: 406,379

[52] U.S. Cl............. 23/253 A, 23/254 E, 23/255 E, 204/195 T, 423/574
[51] Int. Cl...................... G01n 33/16, C01b 17/04
[58] Field of Search........... 23/232 E, 254 R, 254 E, 23/255 E, 253 A, 230 A; 423/574; 204/195 T

[56] References Cited
UNITED STATES PATENTS

| | | | |
|---|---|---|---|
| 2,953,441 | 9/1960 | Clauss | 23/232 E |
| 3,026,184 | 3/1962 | Karasek | 23/232 |
| 3,219,415 | 11/1965 | Hensley | 423/574 |
| 3,692,480 | 9/1972 | Snoek et al. | 423/574 |
| 3,812,243 | 5/1974 | Landrum et al. | 423/574 |

Primary Examiner—R. E. Serwin
Attorney, Agent, or Firm—A. Donald Stolzy

[57] ABSTRACT

An improved Claus process control system utilizing first and second coulometric titrators for automatically controlling the amount of oxygen used in burning a portion of the hydrogen sulfide ($H_2S$) in flue gases. The first and second titrators are fed sulfur dioxide ($SO_2$) scrubbed and unscrubbed samples, respectively, of the flue gases downstream of the oxygen injection point. The first and second titrators produce $H_2S$ and $H_2S + SO_2$ analog output signals, respectively, which are used to control the rate of flow of oxygen or air injected in a manner such that the samples of the flue gases contain $H_2S$ in a concentration which is approximately or exactly equal to twice the concentration of the $SO_2$ therein.

42 Claims, 9 Drawing Figures

CLAUS PROCESS CONTROL SYSTEM

BACKGROUND OF THE INVENTION

This invention relates to the process control art, and more particularly, to an improved method of and system for controlling the Claus process.

Prior art methods and systems for controlling prior art forms of the Claus process have been very complex, expensive and not substantially reliable or accurate.

SUMMARY OF THE INVENTION

In accordance with the present invention, the above-described and other disadvantages of the prior art are overcome by providing a Claus process control of oxygen injection by the use of a fluid sampler, a sulfur dioxide scrubber, and two coulometric titrators.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS -

Figure 1:
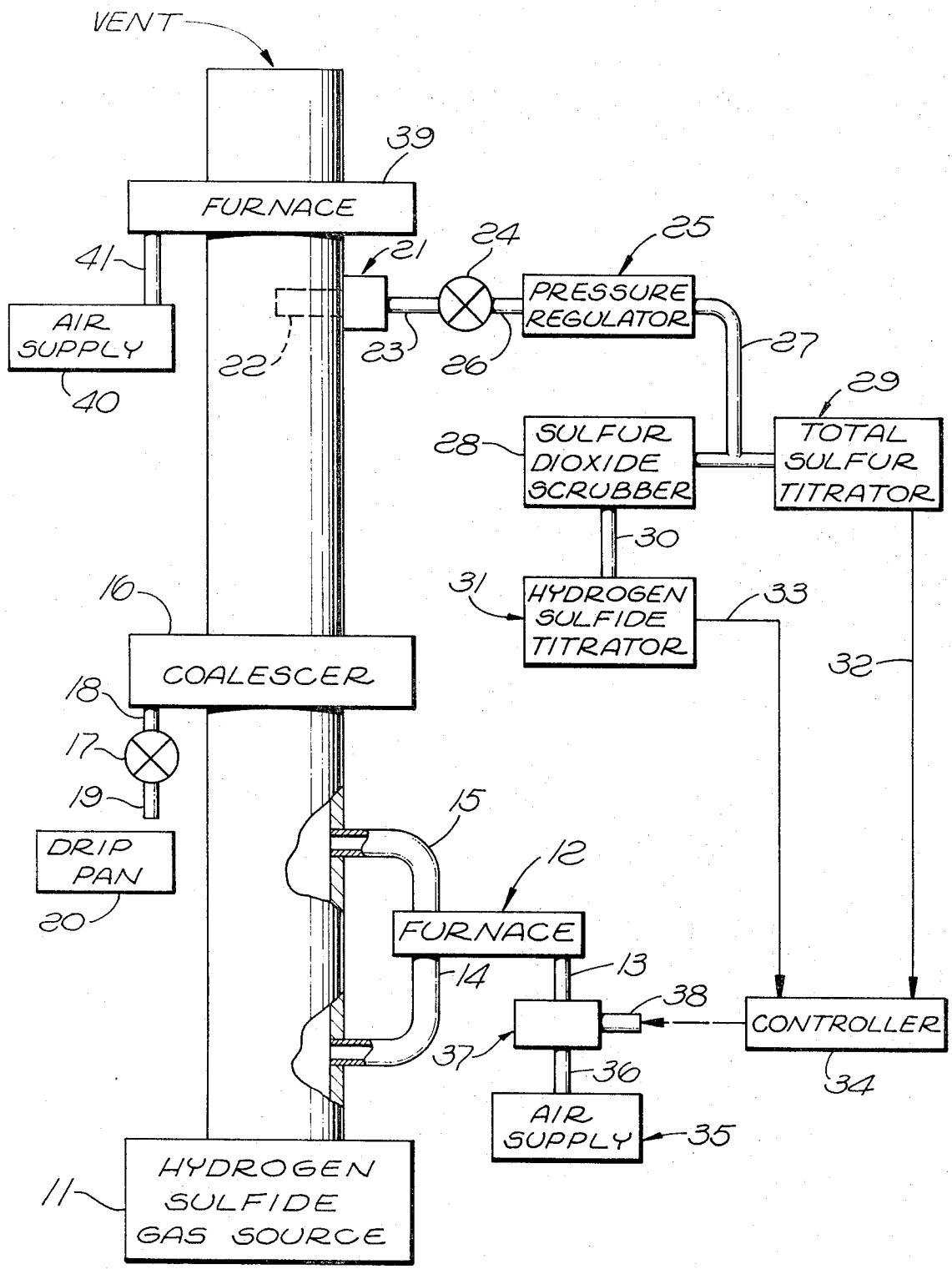
FIG. 1 is a block diagram of one embodiment of the present invention.

In the drawings, in FIG. 1, a new Claus process control system is illustrated. A conventional flue is indicated at 10 which may carry only hydrogen sulfide ($H_2S$) or flue gases, only a portion of which at least sometimes includes hydrogen sulfide and normally in the form of a gas. A hydrogen sulfide gas source is indicated at 11. Source 11 may, for example, be any means for burning fossil or other fuels.

According to the Claus process, a portion of the hydrogen sulfide in flue 10 is oxidized to form sulfur dioxide ($SO_2$) and water. The sulfur dioxide and the remaining hydrogen sulfide is then combined to form elemental sulfur and water in accordance with the following chemical equation, hereinafter referred to as the Claus equation:

$$2H_2S + SO_2 \rightarrow 3S + 2H_2O$$

where $H_2S$ is hydrogen sulfide, $SO_2$ is sulfur dioxide, S is the sulfur atom, H is the hydrogen atomo, and O is the oxygen atom.

In FIG. 1, a furnace 12 is provided having an inlet conduit 13 through which oxygen is supplied. The oxygen in furnace inlet 13 may be supplied in the form of air, if desired. Furnace 12 has another inlet conduit 14 connected from flue 10, and an outlet conduit 15 connected back to flue 10 downstream from the point of connection of furnace inlet conduit 14 with flue 10.

As will be explained hereinafter in greater detail, in FIG. 1 a portion of the hydrogen sulfide gas in flue 10 is drawn through furnace inlet conduit 14 and oxidized with the oxygen in the air supplied in furnace conduit 13. Furnace 12 is closed except for the inlet conduits 13 and 14 thereof, and the outlet conduit 15 thereof. The combustion products formed in furnace 12, thus, are injected back into flue 10 through outlet conduit 15 of the furnace 12. A conventional coalescer 16 is connected in the flue 10 to cause the reaction to move in the direction of the arrow in the equation. Coalescer 16 may be entirely conventional, if desired. Coalescer 16, if desired, may be of the baffle type having its own heat source and heat exchanger to maintain the fluids passing therethrough at between about 300° F. and 400° F. Molten elemental sulfur may be removed from coalescer 16 by opening manually operable valve 17 allowing molten sulfur to pass from an outlet conduit 18 through valve 17 and a spigot 19 to a drip pan 20.

Downstream of the coalescer 16 in FIG. 1 is a fluid sampler 21 which has a probe 22 that is sealed through the wall of flue 10 and an outlet conduit 23. Sampler 21 may be entirely conventional. Alternatively, sampler 21 may be identical to the sampler disclosed in copending application Ser. No. 224,026 filed Feb. 7, 1972, by David M. Creighton for FLUID MONITORING SYSTEM AND FLUID SAMPLING METHOD AND APPARATUS FOR USE THEREWITH.

A manually operable blocking valve 24 in FIG. 1 is connected from sampler outlet conduit 23. Valve 24 is employed simply to allow the outward flow of a sample fluid flowing through outlet conduit 23 of sampler 21 to be turned completely off.

Also shown in FIG. 1 is a pressure regulator 25 having an inlet conduit 26 connected from valve 24 and an outlet conduit 27 connected to a sulfur dioxide scrubber 28 and a total sulfur titrator 29.

In some cases, valve 24 in FIG. 1 and pressure regulator 25 may be completely bypassed by respective conduits, the valve 24 and the pressure regulator 25 eliminated.

Sulfur dioxide scrubber 28 in FIG. 1 has an outlet conduit 30 connected to a hydrogen sulfide titrator 31. Total sulfur dioxide titrator 29 has an electrical output lead 32 upon which a D.C. voltage is impressed that is directly proportional to the sum of the hydrogen sulfide and sulfur dioxide concentrations in the same fluid flowing in pressure regulator outlet conduit 27.

Hydrogen sulfide titrator 31 in FIG. 1 has an electrical output lead 33 upon which is impressed a D.C. voltage directly proportional to the hydrogen sulfide only, and not the sulfur dioxide, in the sample fluid in the pressure regulator outlet conduit 27.

The titrator output leads 32 and 33 in FIG. 1 are connected to a controller 34. Controller 34 adjusts the rate of air flow through furnace inlet conduit 13 from an air supply 35 via an air supply outlet conduit 36 through a needle valve 37 connected therefrom to the lower end of furnace inlet conduit 13.

Needle valve 37 in FIG. 1 may be entirely conventional and has a threaded needle or input device 38 which is rotated by controller 34 responsive to a predetermined function of the magnitudes of the D.C. voltages which appear on titrator output leads 32 and 33 and other variables.

Figure 3:
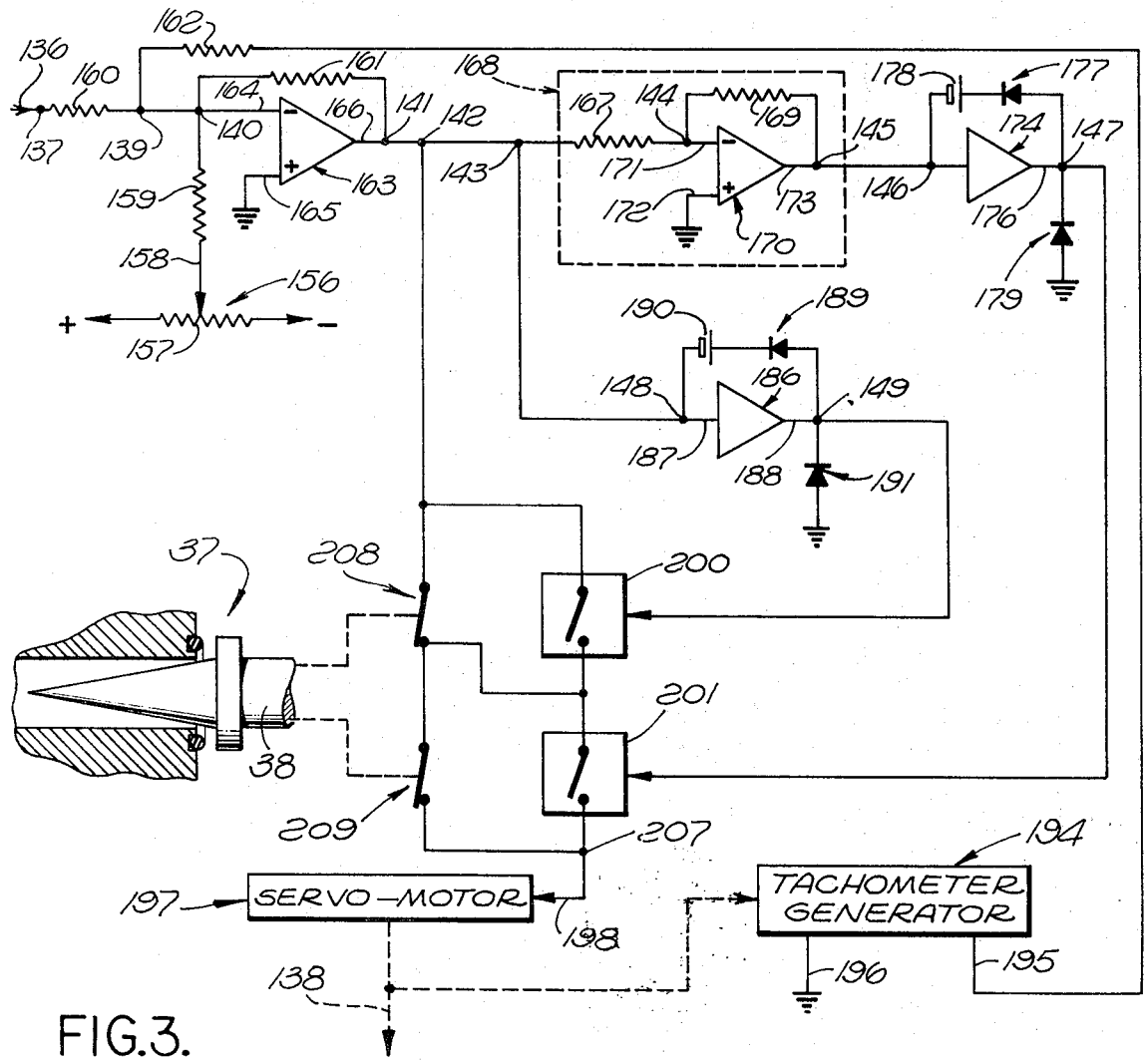
FIG. 3 is a schematic diagram of a servo-mechanism shown in FIG. 2.

In FIG. 3 a furnace 39 is shown connected in flue 10 downstream of sample probe 22 and fed by an air supply 40 via a conduit 41. In this manner, any hydrogen sulfide remaining in flue 10 at the position of sample probe 22 is oxidized to form sulfur dioxide and water usually in vapor form. This is usually preferred although furnace 39, air supply 40 and conduit 41 may be omitted in some cases and the flow from sample probe 22 upwardly in flue 10, as viewed in FIG. 1, vented to the atmosphere. This is illustrated in connection with a flue 10' shown in FIG. 6.

Figure 2:
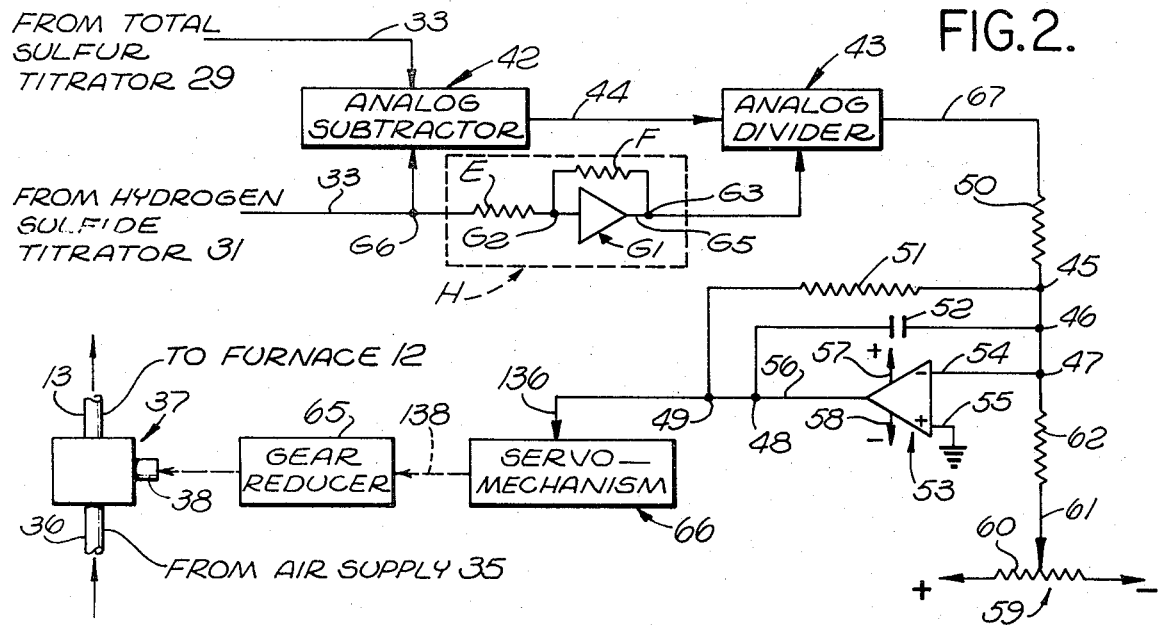
FIG. 2 is a schematic diagram of a controller shown in FIG. 1.

Controller 34 is shown in FIG. 2 having output lead 32 of total sulfur titrator 29 connected as an input to an analog subtractor 42. Analog subtractor 42 also is connected from output lead 33 of hydrogen sulfide titrator 31.

Also shown in FIG. 2 is an analog divider 43 that is connected from an output lead 44 of analog subtractor 42. Analog divider 43 also has a second input connected from hydrogen sulfide titrator output lead 33 through a conventional analog multiplier H.

Multiplier H has junctions G1 and G2 connected respectively to and from respective output and input leads G5 and G4 of an amplifier G1. A resistor E is connected from a junction G6 to junction G2. A resistor F is connected between junctions G1 and G2. The ratio of the resistance of resistor F to that of resistor E is the same as the ratio of the molecular weights of sulfur dioxide and hydrogen sulfide, namely, 64/34.

In FIG. 2, various junctions 45, 46, 47, 48 and 49 are shown. A resistor 50 is connected from an output lead 67 of analog divider 43 to junction 45. Junctions 45, 46 and 47 are connected together. Junctions 48 and 49 are connected together. A resistor 51 is connected between junctions 45 and 49. A capacitor 52 is connected from junctions 46 and 48.

A differential amplifier 53 is provided in FIG. 2, amplifier 53 having an inverting input lead 54, a non-inverting input lead 55 and an output lead 56 connected respectively from junction 47 to ground and to junction 48.

Amplifier 53 in FIG. 2 also has a positive power input lead 57 which may be connected to a constant potential of, for example, 12 volts positive. Amplifier 53 also has a negative power input lead 58 which may be, for example, connected to a potential of 12 volts negative.

A potentiometer 59 is shown in FIG. 2 including a winding 60 connected between, for example, 12 volts positive and 12 volts negative.

Potentiometer 59 in FIG. 2 has a wiper 61. A resistor 62 is connected between potentiometer wiper 61 and junction 47.

In FIG. 2, a servo-mechanism 66 is connected from junction 49 to valve input device 38 through a gear reducer 65. For clarity, needle valve 37 is illustrated in both FIGS. 1 and 2.

The output of gear reducer 65 in FIG. 2 drives valve needle screw or input device 38. The rate of change of the input to gear reducer 65 is varied by the use of servo-mechanism 66.

The use of servo-mechanism 66 in FIGS. 2 and 3 to drive gear reducer 65 makes possible a rate adjustment in accordance with an integral of rate. The use of gear reducer 65 slows down the rate of change with respect to time of the flow rate of the air in furnace inlet 13 and stabilizes the system. It can be made unconditionally stable in this and conventional ways. A change in the control voltage is also slowed down by the use of capacitor 52 in FIG. 2 although the use of capacitor 52 is optional.

Analog subtractor 42 and analog divider 43 in FIG. 2 both may be entirely conventional. The same is true of all of the differential amplifiers disclosed herein, servo-mechanism 66 (velocity servo) and gear reducer 65. The same is also true of source 11, flue 10, needle valve 37, furnace 12, valves 17 and 24, all conduits disclosed herein, drip pan 20, furnace 39, air supply 40, pressure regulator 25, both titrators 29 and 31 and scrubber 28. The same is also true of air supply 35.

Analog subtractor 42 in FIG. 2 produces a D.C. voltage on the output lead 44 thereof which is directly proportional to the sulfur dioxide in the sample fluid in pressure regulator outlet conduit 27.

A D.C. voltage is impressed upon divider output lead 67 in FIG. 2 by analog divider 43 that is directly proportional to the ratio of the hydrogen sulfide concentration of the sulfur dioxide concentration in pressure regulator outlet conduit 27. All the structure connected from analog divider output lead 67 to servo-mechanism 66 is primarily an analog adder except for the capacitor 62 which slows down operation. What the adder is, for example, the D.C. output voltage on analog divider output lead 67 and the voltage which appears at potentiometer wiper 61. In general, if the D.C. voltage on analog divider output lead 67 is positive, the voltage appearing on potentiometer wiper 61 will be a negative voltage equal to a voltage necessary to cause the output of amplifier 53 to be zero, i.e. ground potential. Normally potentiometer wiper 61 will be moved to a position on winding 60 such that the magnitude of the negative potential on wiper 61 will represent a ratio of the concentrations of hydrogen sulfide and sulfur dioxide in the sample fluid in the outlet conduit 27 of pressure regulator 25 equal to 2:1. This ratio is determined by the Claus equation. Note that this equation requires two molecules of hydrogen sulfide to be combined with one molecule of sulfur dioxide. Somewhat different ratios may be employed by adjusting the position of wiper 61 on winding 60 of potentiometer 59. The position of wiper 61 also may be calibrated with indicia in terms of the hydrogen sulfide and sulfur dioxide ratio of the respective concentrations thereof.

As shown in FIGS. 2 and 3, servo-mechanism 66 has an input lead 136 connected from junction 49 in FIG. 2 to an input junction 137 in FIG. 3. As shown in both FIGS. 2 and 3, servo-mechanism 66 has an output shaft 138 which is connected to the input of gear reducer 65 in FIG. 2.

In FIG. 3, various other junctions are shown throughout the circuit including junctions 139, 140, 141, 142, 143, 144, 145, 146, 147, 148, 149 and 207.

A potentiometer 156 is shown in FIG. 3 having a winding 157 and a wiper 158. A resistor 159 is connected from wiper 158 to junction 140. Junctions 139 and 140 are connected together. A resistor 160 is connected between junctions 137 and 139. A resistor 161 is connected between junctions 140 and 141. A resistor 162 is connected from an output lead 195 of a tachometer generator 194 driven by a servo-motor 197. Tachometer generator 194 has another output lead 196 which is grounded.

In FIG. 3, a differential amplifier 163 is provided having an inverting input lead 164 connected from junction 140 and a non-inverting input lead 165 connected to ground. Amplifier 163 also has an output lead 166 connected to junction 141. Junctions 141, 142 and 143 are connected together. A resistor 167 in a conventional inverter amplifier 168 is connected between junctions 143 and 144. A resistor 169 is connected between junctions 144 and 145. A differential amplifier 170 is provided with an inverting input lead 171 connected from junction 144, a non-inverting input lead 172 connected to ground, and an output lead 173 connected to junction 145. Junctions 145 and 146 are connected together. An amplifier 174 has an input lead 175 connected from junction 146 and an output lead 176 connected to junction 147. A diode 177 and a biasing source of potential 178 are connected in succession in series in that order from junction 147 to junction 146. Source 178 is poled to back bias diode 177. A diode 179 is connected from ground to junction 147 and poled to be conductive in a direction toward junction 147.

In FIG. 3, junctions 147 and 204 are connected together.

In FIG. 3, conventional electronic switches are illustrated at 200 and 201. Receipt of a positive potential at junction 147 closes switch 201 through lead 203 connected from junction 204. When junction 147 is maintained at ground potential, switch 201 is open, as shown.

In FIG. 3, an amplifier 186 is shown having an input lead 187 connected from junction 148 and an output lead 188 connected to junction 149. As before, a diode 189 and a source of biasing potential 190 are connected in succession in series in that order from junction 149 to junction 148. Again, source 190 is poled to back bias diode 189. Note will be taken that both diodes 177 and 189 are poled to be conductive in directions away from junctions 147 and 149, respectively. A diode 191 is connected from ground to junction 149, and poled to be conductive in a direction toward junction 149. Junctions 143 and 148 are connected together. Junctions 149 and 205 are connected together. When the potential of junction 149 is positive with respect to ground, switch 200 is closed by the application of a positive potential to lead 206 connected from junction 205.

As shown in FIG. 3, servo-motor 197 is provided having an input lead 198 connected from a junction 207 and output shaft 138 which drives gear reducer 65 (FIG. 2), and drives tachometer generator 194, as well.

In FIG. 3, normally closed limit switches 208 and 209 are opened on the respective full closing and full opening of valve 37. Limit switches 208 and 209 are connected in parallel with electronic switches 200 and 201, respectively. Switches 200 and 201 are connected in succession, in series in that order from junction 142 to junction 207.

In the operation of the servo-mechanism 66 shown in FIG. 3, because of the inversions of amplifiers 53 and 163 in FIGS. 2 and 3, respectively, the tachometer generator output is returned via resistor 162 to junction 139. The phrase "positive or negative potential" herein means positive or negative both with respect to ground. The potential of junction 49 (FIG. 2) may, thus, be positive when the air flow rate in conduit 13 is increasing and the feedback from tachometer generator 194 is positive. The velocity feedback from tachometer generator 194 makes the process control system stable because the angular velocity of device 38 in FIG. 1 is zero when the displacement error (junction 49) is zero (ground potential).

In FIG. 3, the potential of junction 147 is positive when the potential of junction 142 is negative. The potential of junction 149 is positive when the potential of junction 142 is positive. Diodes 179 and 191 maintain the potentials of the respective junctions 147 and 149 at ground potential when the junctions 146 and 148 have potentials negative with respect to ground. Amplifiers 174 and 186 are, thus, non-inverting amplifiers.

OPERATION

In the operation of the embodiment illustrated in FIG. 1, hydrogen sulfide is supplied by source 11 and with other flue gases rises in flue 10. A portion of this hydrogen sulfide gas is then oxidized in furnace 12. The combustion products of furnace 12 are then injected back into flue 10 via outlet conduit 15, furnace 12 being closed except for air inlet conduit 13, flue gas inlet conduit 14, and outlet conduit 15.

Sampler 21 then removes a sample of the flue gas mixture in flue 10 including both hydrogen sulfide and sulfur dioxide gas after a large percentage of each (e.g. 99 percent) has been removed by the coalescer 16. This sample passes through conduit 23, valve 24, conduit 26, pressure regulator 25 and pressure regulator outlet conduit 27. From this point, a first portion of the sample gas in conduit 27 is passed to total sulfur titrator 29 and a second portion thereof is passed through sulfur dioxide scrubber 28. The D.C. voltage on the output lead 32 of total sulfur titrator 29 is then directly proportional to the sum of the respective concentrations of hydrogen sulfide and sulfur dioxide in the fluid sample passing through pressure regulator outlet conduit 27.

Sulfur dioxide 28 removes the sulfur dioxide from the fluid sample passing through conduit 27. Hydrogen sulfide titrator 31, through conduit 30, receives a third portion of the fluid sample flowing through conduit 27. The said third portion is the same as the second without sulfur dioxide. The transfer function between the output signals of titrators 29 and 31 to the rate of flow of air in conduit 13 is not critical and need not be linear with any function of hydrogen sulfide and/or sulfur dioxide concentration in the fluid sample flowing in conduit 27. This is true because the system of FIG. 1 is a null seeking servo-mechanism. Further, controller 34 may be a position or velocity servo which operates on a number of different functions of the output signals of titrators 29 and 31. When controller 34 is that shown in FIG. 2, and servo-mechanism 66 therein is that shown in FIG. 3, the servo-mechanism 66 is provided with a velocity feedback to make the process stable. This is not always necessary.

In the case of FIG. 2, controller 34 turns needle valve screw 38 until the oxygen supply is adequate to drive the D.C. voltage appearing at the output lead 67 of analog divider 43 in FIG. 2 to the same potential at which the wiper 61 on potentiometer 59 is set. This is also not necessarily true. This assumes that the resistance of each of the resistors 50 and 62 in FIG. 2 is the same. If they are different, the D.C. potential of lead 67 will be a predetermined fraction larger or smaller than the potential of potentiometer wiper 61.

In accordance with the foregoing, it will be appreciated that servo-mechanism 66 may be of the type to be described in connection with FIG. 7, and gear reducer 65 may be omitted in some cases. Further, needle valve 37 may be omitted and another device substituted therefor.

Figure 4:
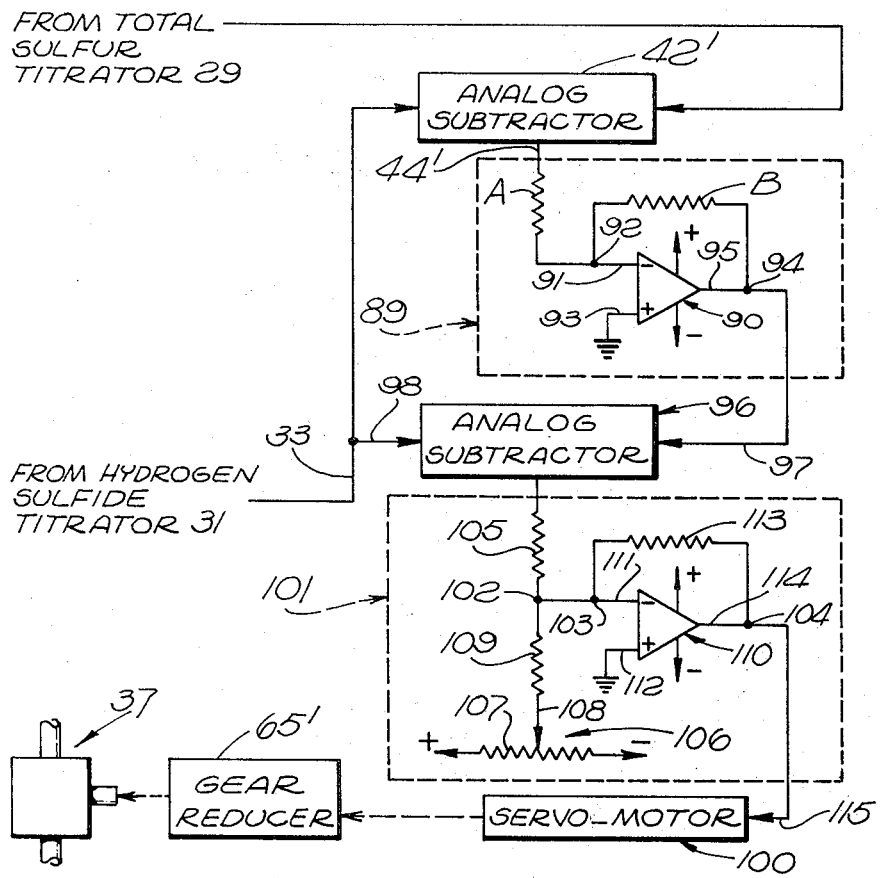
FIGS. 4, 5 and 6 are schematic diagrams of three respective alternative embodiments of the present invention.

FIG. 4 is a schematic diagram of an alternative for controller 34 in FIG. 1. As before, an analog subtractor 42' receives an input from titrator 29, and a second input from titrator 31. Analog subtractor 42' has an output lead 44' upon which a D.C. voltage is impressed that is directly proportional to the sulfur dioxide concentration in the sample fluid flowing in conduit 27. The voltage on analog subtractor output lead 44' is multiplied by a factor of 2.0 by an analog multiplier 89, which may be entirely conventional. Multiplier 89 has a differential amplifier 90 with an inverting input lead 91 connected from a junction 92 and a non-inverting input lead 93 connected to ground. A resistor A is connected from analog subtractor output lead 44' to junction 92. A feedback resistor B is connected from junction 92 to a junction 94. Amplifier 90 has an output lead 95 also connected to junction 94. The ratio of the resistance of resistor B to that of resistor A is two times the ratio of the molecular weights of hydrogen sulfide and sulfur dioxide, namely 2 × 34/64.

An analog subtractor 96 has one input lead 97 connected from multiplier junction 94, and another input lead 98 connected from titrator lead 33. Analog subtractor 96 has an output lead 99 upon which a D.C. voltage is impressed that is directly proportional to the difference between the concentrations of hydrogen sulfide and sulfur dioxide in the sample fluid flowing in conduit 27. Analog subtractor 96 is arranged so as to cause a servo-motor 100 to drive valve 37 to increase the rate of flow of oxygen to furnace 12 when the D.C. voltage on lead 98 exceeds the D.C. voltage on lead 97 indicating that the hydrogen sulfide concentration is more than twice the sulfur dioxide concentration in the sample fluid flowing in conduit 27. The converse is also true.

Figure 5:
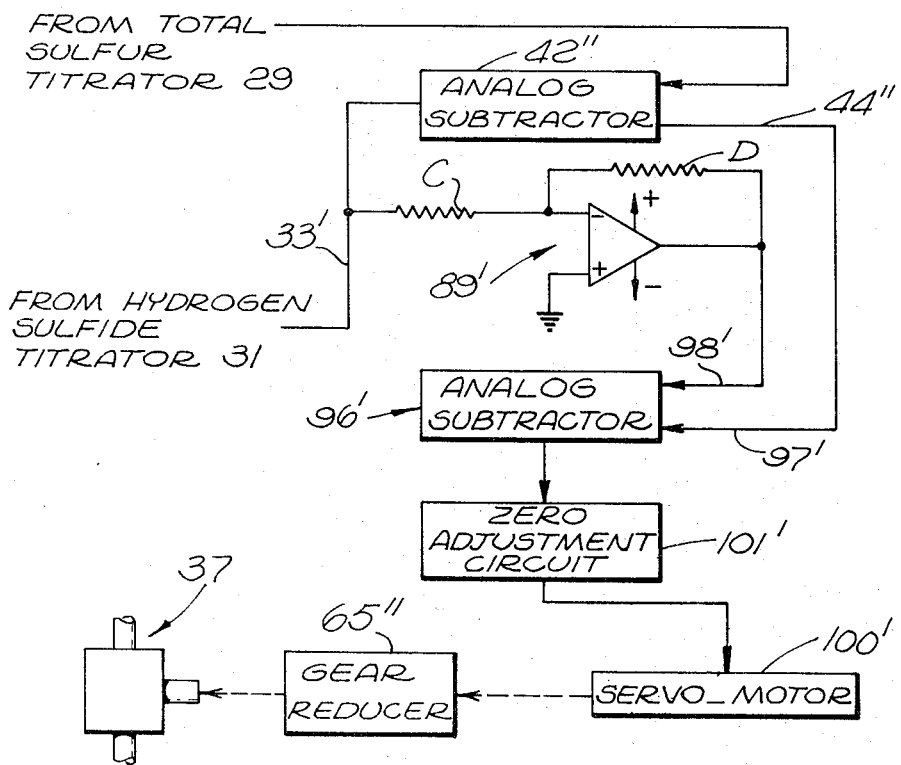

Also shown in FIG. 4 is a zero adjustment circuit 101 which may be omitted in many cases. This circuit has three junctions 102, 103 and 104. A resistor 105 is connected from lead 99 to junction 102. A potentiometer 106 is provided having a winding 107 and a wiper 108. A resistor 109 is connected from wiper 108 to junction 102. Junctions 102 and 103 are connected together. A differential amplifier 110 is provided having an inverting input lead 111 connected from junction 103 and a non-inverting input lead 112 connected to ground. A resistor 113 is connected between junctions 103 and 104. Amplifier 110 has an output lead 114 connected to junction 104. Servo-motor 100 has an input lead 115 connected from junction 104. Servo-motor 100 drives valve 37 through a gear reducer 65'. Still another alternative embodiment of the controller 34 is shown in FIG. 5. The embodiment shown in FIG. 5 may be identical to the embodiment shown in FIG. 4 except as indicated in the following. The embodiment of FIG. 5 has a multiplier 89' which is identical to multiplier 89 except that resistors C and D replace resistors A and B, and resistor C is connected from the output of titrator 31 rather than from the output of analog subtractor 42''. Further, analog subtractor output lead 44'' is connected directly to analog subtractor 96' rather than through multiplier 89'. The output of multiplier 89' is then connected as an input to analog subtractor 96'. Thus, analog subtractor 96' has input leads 97' and 98'. The voltage appearing on input lead 97' is directly proportional to the sulfur dioxide concentration in the sample fluid flowing in conduit 27. The voltage appearing on input lead 98' is directly proportional to one-half the concentration of hydrogen sulfide in the sample fluid flowing in conduit 27. This is accomplished because the multiplier 89' multiplies the hydrogen sulfide concentration analog by a factor of one-half the molecular weight ratio, i.e. ½ × 64/34. This is true because the resistance of resistor D is ½ × 64/34 of the resistance of resistor C.

The mode of operation with the embodiment of FIG. 5 is similar to that of the embodiment illustrated in FIG. 4. In particular, when one-half of the hydrogen sulfide analog exceeds the sulfur dioxide analog, servo-motor 100' drives valve 37 through gear reducer 65'' to increase the oxygen supplied to furnace 12. The converse is also true.

Figure 6:
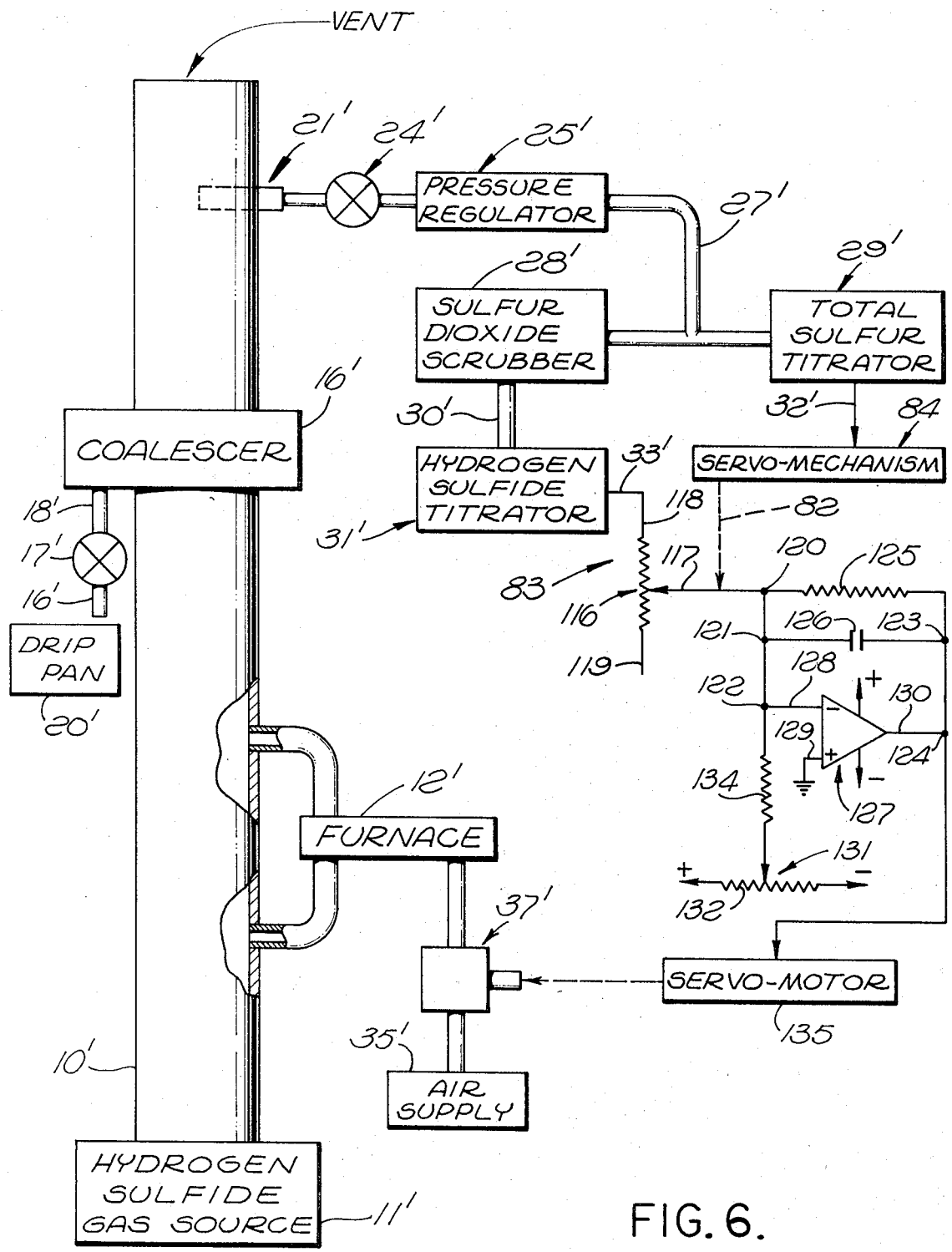

All the structures shown in FIG. 6 may be identical to all those respective shown in FIG. 1 except the structures connected from titrator output leads 32' and 33' to needle valve 37'.

In FIG. 6, a servo-mechanism 84 is connected from titrator output lead 32'. Servo-mechanism 84 is illustrated in FIG. 7.

Figure 7:
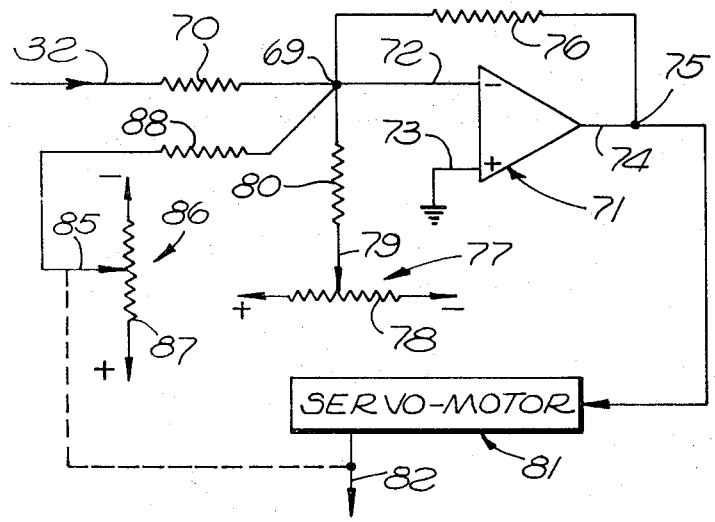
FIG. 7 is a schematic diagram of a servo-mechanism shown in FIGS. 6 and 8.

Servo-mechanism 84 is shown in FIG. 7. In FIG. 7, lead 32' is connected to a summing junction 69 by a resistor 70. A differential amplifier 71 has an inverting input lead 72 connected from junction 69 and a non-inverting input lead 73 connected to ground. Amplifier 71 has an output lead 74 connected to an output junction 75. A resistor 76 is connected between junctions 69 and 75. A potentiometer 77 is connected, as before, and has a winding 78 and a wiper 79. A resistor 80 is connected between junction 69 and wiper 79, as before. A servo-motor 81 has an output shaft 82 which drives wiper 117 on winding 116 of a potentiometer 83 (FIG. 6). The servo-mechanisms 66, 84 and 84' in FIGS. 1, 6 and 8, respectively, may not be conventional and may or may not be identical to each other or to the servo-mechanisms shown in FIGS. 3 and 7. The servo-mechanism 84 in FIG. 7 has a feedback from a wiper 85 of a potentiometer 86 connected, as before, with a winding 87. Wiper 85 is connected to junction 69 via a resistor 88.

In FIG. 6, a hyperbolic potentiometer winding 116 has one end 118 connected from titrator output lead 33' and another lead 119 which is not connected to anything. The hyperbolic winding makes the potential at a junction 120 directly proportional to the ratio of the potentials on leads 32' and 33'. The reciprocal, however, could be used.

In FIG. 6, various junctions are provided throughout the circuit. These junctions are 120, 121, 122, 123 and 124. A resistor 125 is connected between junctions 120 and 123. A capacitor 126 is connected between junctions 121 and 123. A differential amplifier 127 is provided having an inverting input lead 128 connected from junction 122, and a non-inverting input lead 129 connected to ground. Amplifier 127 has an output lead 130 connected to junction 124. Another potentiometer is provided at 131 having a winding 132 and a wiper 133. A resistor 134 is connected from wiper 133 to junction 122. A servo-motor 135 is connected from junction 124 to needle valve 37'.

Figure 8:
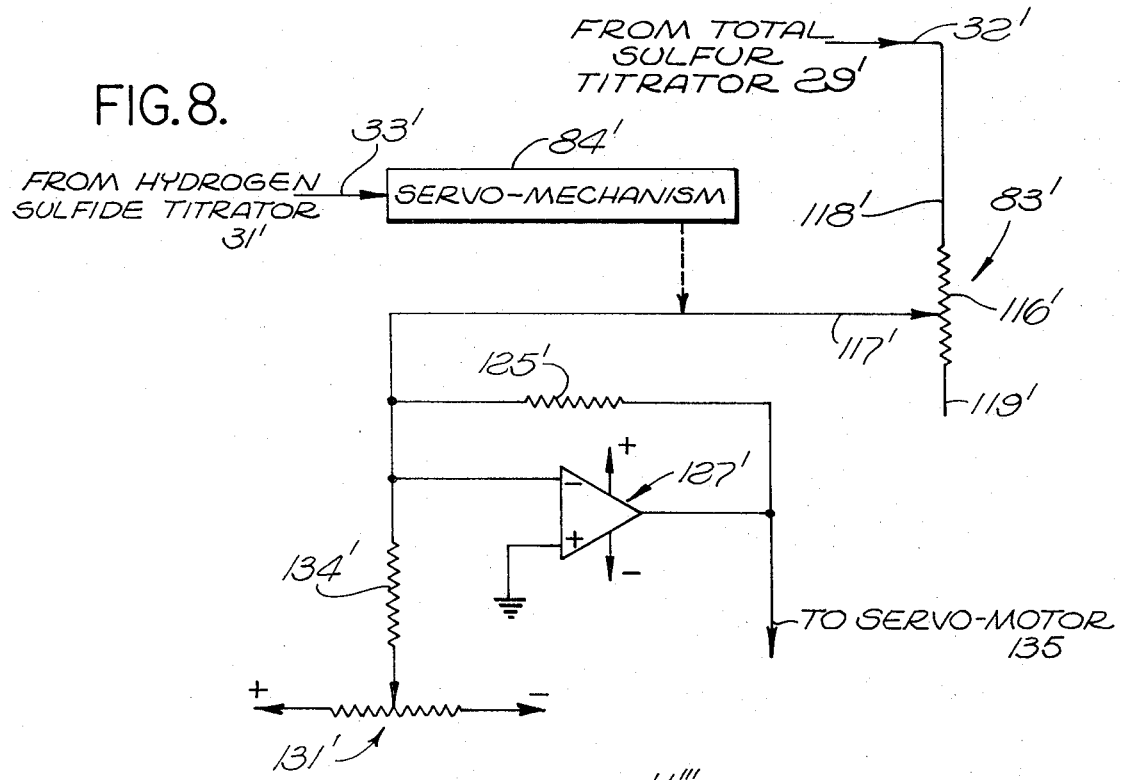
FIGS. 8 and 9 are schematic diagrams of still other alternative embodiments of the present invention.

Still another alternative embodiment of the controller of the present invention is illustrated in FIG. 8 wherein a servo-mechanism 84' drives a wiper 117' of a potentiometer 83'. Potentiometer 83' has a winding 116' with ends 118' and 119'. End 119' is not connected to anything. End 118' is connected from the output lead 32' of total sulfur titrator 29'. The structure connected from wiper 117' to servo-motor 135 may be identical to that shown in FIG. 6 except for the omission of capacitor 126.

Figure 9:
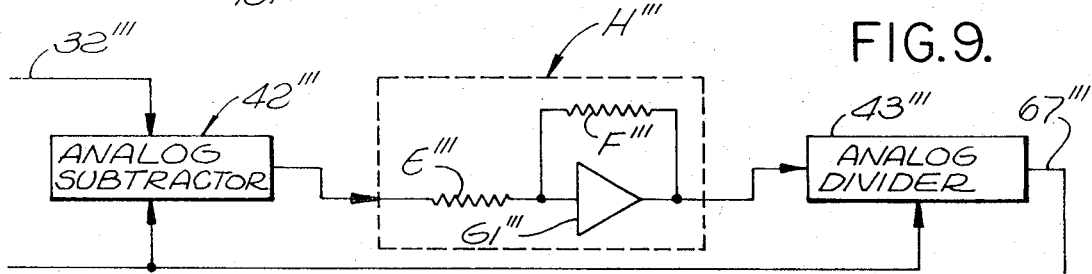

FIG. 9 is a modification of FIG. 2. Multiplier H''' is identical to multiplier H except that the ratio of the resistance of resistor F''' to that of resistor E''' is 34/64.

All identical reference numbers, except for the use of one or more prime marks, refer to structures which may or may not be identical, as desired.

The word "fluid" is hereby defined for use herein and for use in the claims, unless operative with liquids, to mean substantially only a single gas compound or substantially only a mixture of different gases. For example, the invention will be found useful in connection with the removal of sulfur from a mixture of gases including hydrogen sulfide gas which normally are vented from a flue.

As explained previously, preferably an excess of hydrogen sulfide gas is introduced to furnace 12 through inlet conduit 14 to make sure that the oxygen in the air introduced through inlet conduit 13 does not exist as elemental oxygen gas in outlet conduit 15 and to make sure that most all available oxygen oxidizes the hydrogen sulfide. Normally, furnace 12 may take approximately one-third to all the flow through flue 10.

Additional inverting and non-inverting amplifiers may be used, as desired, throughout all of this disclosure.

If desired, any one or more or all of the computation functions performed by the controllers disclosed herein may be performed by digital computers instead of analog computers without departing from the invention.

Capacitor 52 in FIG. 2 and capacitor 126 in FIG. 6 both may be omitted, if desired.

Controller 34 may use one or more of any digital or analog computers, conventional or not. Alternatively, portions of the controller computing functions may be analog and other portions may be digital. Still further, all of the computer portions of the controller may be analog or all of them may be digital.

Scrubber 28 may be entirely conventional except that the scrubber solution employed therein may or may not be conventional. For example, the solution of scrubber 28 may be that disclosed in U.S. Pat. No. 3,757,488.

In some cases, sampler probe 22 in FIG. 1 may be located either upstream or downstream from coalescer 16. However, outlet conduit 15 of furnace 12 will always be connected to flue 10 upstream of coalescer 16, as shown in FIG. 1. Further, sampler probe 22 will always be located downstream of the connection of conduit 15 with flue 10.

The word "concentration" is hereby defined for use herein and for use in the claims as well, to mean approximately or exactly the percent by weight or volume (percent by weight and by volume are about the same) or this percent divided by the molecular weight. The Claus equation is a molecular solution. As is well known, the molecular weight of hydrogen is about 1 gram, the molecular weight of sulfur is about 32 grams and the molecular weight of oxygen is about 16 grams. The molecular weight of hydrogen sulfide is then about 34 grams, and the molecular weight of sulfur dioxide is about 64 grams.

Conventional titrators, e.g. those of the type disclosed in U.S. Pat. No. 3,448,031, have concentional zero and span adjustments for molecular weight weighting, if desired. Such weighting requires only constant scale factors, i.e. zero and/or span.

The phrase "molecular ratio" is hereby defined for use herein and in the claims to mean the ratio of the gram molecular weight of hydrogen sulfide to the gram molecular weight of sulfur dioxide or the reciprocal thereof.

The phrase "divider means" is hereby defined for use herein and for use in the claims to include at least either multiplier H and divider 43 in FIG. 2, or multiplier H''' in FIG. 9, or any other alternative.

The manner of supplying oxygen and/or air through inlet conduit 13 of furnace 12 may be performed in a great many ways different from that disclosed herein without departing from the present invention. Included, but not limited to, one or more of these ways is utilizing an air pump, the speed of which is operated by controller 34. Further, air supply 35 may be either a compressed air source, a compressed oxygen source or an air compressor having an intake from the atmosphere.

Valve 37 need not be a needle valve but may be another valve which may be varied to vary the rate of flow of air or oxygen in furnace inlet conduit 13.

If valve 37 is an air pump or compressor, controller 34 may supply a velocity control thereof using a tachometer feedback similar to or the same as that shown in servo-mechanism 66 of FIG. 3. An additional amplifier and servo-motor may be provided for this purpose, if desired.

The phrase "source of oxygen" is hereby defined for use herein and for use in the claims as including, but not limited to, a source of compressed oxygen or air, and oxygen or air pump, a furnace with a variable draft and an atmospheric or oxygen air intake or otherwise.

The word "subtractor" as used herein and as used in the claims, is hereby defined to include either an analog or a digital subtractor.

The word "divider" as used herein and as used in the claims, is hereby defined to include either an analog or a digital divider.

The word "adder" as used herein and as used in the claims, is hereby defined to include either an analog or a digital adder.

The word "multiplier" as used herein and as used in the claims, is hereby defined to include either an analog or a digital multiplier.

The word "constant" is hereby defined for use herein and for use in the claims to means "approximately constant" as either absolutely constant or constant over certain periods or manually adjustable only or otherwise adjustable.

In FIG. 2, it will be noted that potentiometer 59 generally will supply only a negative potential to resistor 62 at wiper 61 if the D.C. voltage at the output lead 67 of analog divider 43 is generally only positive.

The phrase "one magnitude equal to another" is hereby defined for use herein and for use in the claims to mean that the absolute values of the magnitudes are equal to each other. Generally, as stated previously, for example, when the D.C. voltage on lead 67 in FIG. 2 is positive, wiper 61 will be moved to a position where it is negative. The converse is also true.

The word "drive" is hereby defined for user herein and for use in the claims to mean a drive in either direction, e.g. a drive increasing or decreasing the oxygen flow rate through inlet conduit 13 of furnace 12 in FIG. 1.

The phrase "algebraic sum" is hereby defined for use herein and for use in the claims to have its conventional meaning. That is, the addition of a minus to a plus is the difference between the numbers.

Reference to sampler 21 in FIG. 1 likewise is a reference to sampler 21' in FIG. 6. Similarly, reference to any number having one or more prime marks is to be considered herein as a reference to the number with fewer or not prime marks. Conversely, reference to any number having no prime marks is also hereby defined to be a reference to a structure having this same number with one or more prime marks added.

From the foregoing, it will be noted that the Claus process is used at least for the purpose of producing sulfur and/or to remove sulfut from fluid streams which contain 100 percent or some other percent of hydrogen sulfide.

In FIG. 2, if the resistance of resistor 51 is properly selected, multipliers H and H''' may be omitted.

If desired, resistors 51 (FIG. 2), 113 (FIG. 4), 125 (FIG. 6) and other resistors may be variable resistors to adjust gain and/or span.

What is claimed is:

1. A process control system comprising: first means for connection with apparatus confining the flow of a fluid, a portion or all of said fluid at least sometimes being hydrogen sulfide gas, said first means having an outlet conduit and being actuable to supply a flow of a sample of said fluid through said outlet conduit; a scrubber having an inlet conduit connected from said first means outlet conduit to receive a first portion of said fluid sample having its own outlet conduit, said scrubber being chargeable with a solution such that said scrubber passes hydrogen sulfide, whenever it is or is carried in said first fluid sample portion, through said inlet conduit thereof to said outlet conduit thereof while said scrubber removes sulfur dioxide from said first fluid sample portion whenever said first fluid sample portion is or carries sulfur dioxide; first and second coulometric titrators having first and second inlet conduits, respectively, and first and second electrical output leads, respectively, said first titrator inlet conduit being connected from said first means outlet conduit to receive a second portion of said fluid sample, said first titrator producing an electrical output signal on said first lead thereof of a magnitude directly proportional to the sum of the concentrations of hydrogen sulfide and sulfur dioxide in said sample fluid, respectively, said second titrator inlet conduit being connected from said scrubber outlet conduit to receive the fluid which passes through said scrubber outlet conduit, said second titrator producing an electrical output signal on said second output lead thereof of a magnitude directly proportional to the concentration of hydrogen sulfide but not sulfur dioxide in said sample fluid; and second means connected from said first and second output leads of said first and second titrators, respectively, for connection with said flow confining apparatus at a location upstream of the connection of said first means therewith, and responsive to said titrator output signals and the magnitudes thereof for introducing oxygen in pure form or in a fluid mixture into said fluid confining apparatus at a variable flow rate and at a temperature to oxidize hydrogen sulfide therein; flow of fluid in said flow confining apparatus, said first means, said scrubber, said first and second titrators, and said second means each forming a link in a closed loop null seeking servo-mechanism in which said second means is actuable to vary or maintain constant said oxygen flow rate in a manner to drive the magnitudes of the output signals of said titrators to values indicating that there are concentrations larger than zero of both hydrogen sulfide and sulfur dioxide in said sample fluid and values indicating that the concentration of hydrogen sulfide in said sample fluid times the molecular ratio 64/34 is approximately twice as large as the concentration of sulfur dioxide in said sample fluid.

2. The invention as defined in claim 1, wherein a coalescer is adapted for connection with said flow confining apparatus downstream of the location at which said second means is adapted for connection therewith to form and to extract elemental sulfur from hydrogen sulfide ($H_2S$) and sulfur dioxide ($SO_2$) in said fluid in accordance with the chemical equation:

$$2H_2S + SO_2 \rightarrow 3S + 2H_2O$$

where H, S and O are symbols for the hydrogen, sulfur and oxygen atoms, respectively.

3. The invention as defined in claim 2, wherein said first means is adapted for connection to said flow confining apparatus at a location downstream of the location at which said coalescer is adapted for connection with said flow confining apparatus.

4. The invention as defined in claim 3, wherein said second means includes a controller connected from both of said titrator output leads, a furnace closed except for first and second inlets and an outlet, said first furnace inlet being adapted for connection from said flow confining means upstream of the respective locations at which said coalescer and said first means are adapted for connection with said flow confining apparatus, said furnace outlet being connected back to said flow confining apparatus at a predetermined location upstream of the respective locations at which said coalescer and said first means are adapted for connection with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of hydrogen sulfide in said sample fluid times the molecular ratio 64/34 is approximately twice as large as the concentration of sulfur dioxide in said sample fluid.

5. The invention as defined in claim 4, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signals on the respective output leads thereof, and third means connected from said divider means output lead to said controller output device to vary said controller output device in a manner to drive said divider means output signal to an approximately constant predetermined magnitude, said subtractor output signal being directly proportional to the concentration of sulfur dioxide in said sample fluid, the output signal of said divider means being directly proportional to the product of first and second ratios, said first ratio being the ratio of the concentration of the hydrogen sulfide in said sample fluid to the concentration of the sulfur dioxide therein, said second ratio being the molecular ratio 64/34.

6. The invention as defined in claim 5, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means having an output device connected to said controller output device, and sixth means having an output lead to supply an output signal thereon of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider means output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

7. The invention as defined in claim 6, wherein said sixth means is adjustable to adjust the magnitude of the output signal thereof.

8. The invention as defined in claim 7, wherein said sixth means is manually adjustable 9. The invention as defined in claim 8, wherein said divider means output signal is a D.C. output voltage directly proportional to said product of ratios, said fourth means including a differential amplifier having inverting and non-inverting input leads, and an output lead, a first resistor connected from said divider means output lead to said amplifier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different respective constant potentials, at least one of said conductor potentials having a polarity opposite that of said divider means D.C. output voltage, said wiper being connected to said third resistor second lead.

10. The invention as defined in claim 1, wherein said second means includes a controller connected from both of said titrator output leads, a furnace closed except for first and second inlets and an outlet, said first furnace inlet being adapted for connection from said flow confining means upstream of the location at which said first means is adapted for connection with said flow confining apparatus, said furnace outlet being connected back to said flow confining apparatus at a predetermined location upstream of the location at which said first means is adapted for connection with said flow confining apparatus, said second means including a source of a reaction fluid all or a portion of which contains oxygen, said reaction fluid source having an input device connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of hydrogen sulfide in said sample fluid times the molecular ratio 64/34 is approximately twice as large as the concentration of sulfur dioxide in said sample fluid.

11. The invention as defined in claim 10, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signals on the respective output leads thereof, and third means connected from said divider means output lead to said controller output device to vary said controller output device in a manner to drive said divider means output signal to an approximately constant predetermined magnitude, said subtractor output signal being directly proportional to the concentration of sulfur dioxide in said sample fluid, the output signal of said divider means being directly proportional to the product of first and second ratios, said first ratio being the ratio of the concentration of the hydrogen sulfide in said sample fluid to the concentration of the sulfur dioxide therein, the second ratio being the molecular ratio 64/34.

12. The invention as defined in claim 11, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means having an output device connected to said controller output device, and sixth means having an output lead to supply an output signal thereon of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider means output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

13. The invention as defined in claim 12, wherein said sixth means is adjustable to adjust the magnitude of the output signal thereof.

14. The invention as defined in claim 13, wherein said sixth means is manually adjustable.

15. The invention as defined in claim 14, wherein said divider means output signal is a D.C. output voltage directly proportional to said product of ratios, said fourth means including a differential amplifier having inverting and non-inverting input leads, and an output lead, a first resistor connected from said divider output lead to said amplifier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different respective constant potentials, at least one of said conductor potentials having a polarity opposite that of said divider D.C. outut voltage, said wiper being connected to said third resistor second lead.

16. The invention as defined in claim 2, wherein said second means includes a controller connected from both of said titrator output leads, a furnace closed except for first and second inlets and an outlet, said first furnace inlet being adapted for connection from said flow confining means upstream of the respective locations at which said coalescer and said first means are adapted for connection with said flow confining apparatus, said furnace outlet being connected back to said flow confining apparatus at a predetermined location upstream of the respective locations at which said coalescer and said first means are adapted for connection with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of hydrogen sulfide in said sample fluid times the molecular ratio 64/34 is approximately twice as large as the concentration of sulfur dioxide in said sample fluid.

17. The invention as defined in claim 16, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signals on the respective output leads thereof, and third means connected from said divider means output lead to said controller output device to vary said controller output device in a manner to drive said divider means output signal to an approximately constant predetermined magnitude, said subtractor output signal being directly proportional to the concentration of sulfur dioxide in said sample fluid, the output signal of said divider means being directly proportional to the product of first and second ratios, said first ratio being the ratio of the concentration of the hydrogen sulfide in said sample fluid to the concentration of the sulfur dioxide therein, said second ratio being the molecular ratio 64/34.

18. The invention as defined in claim 17, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means input lead, said fifth means having an output device connected to said controller output device, and sixth means having an output lead to supply an output signal thereon of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider means output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

19. The invention as defined in claim 18, wherein said sixth means is adjustable to adjust the magnitude of the output signal thereof.

20. The invention as defined in claim 19, wherein said sixth means is manually adjustable.

21. The invention as defined in claim 20, wherein said divider means output signal is a D.C. output voltage directly proportional to said product of ratios, said fourth means including a differential amplifier having inverting and non-inverting input leads, and an output lead, a first resistor connected from said divider means output lead to said amplifier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different perspective constant potentials, at least one of said conductor potentials having a polarity opposite that of said divider means D.C. output voltage, said wiper being connected to said third resistor second lead.

22. A process control system comprising: a source of an input fluid; apparatus connected from said input fluid source confining the flow of said input fluid therefrom, a portion or all of said input fluid at least sometimes being hydrogen sulfide gas; first means connected from said flow confining apparatus, having an outlet conduit, and being actuable to supply a flow of a sample of said input fluid through said outlet conduit; a scrubber having an inlet conduit connected from said first means outlet conduit to receive a first portion of said fluid sample, said scrubber having its own outlet conduit, said scrubber being charged with a solution such that said scrubber passes hydrogen sulfide, whenever it is or is carried in said first fluid sample portion, through said inlet conduit thereof to said outlet conduit thereof while said scrubber removes sulfur dioxide from said first fluid sample portion whenever said first fluid sample portion is or carries sulfur dioxide; first and second coulometric titrators having first and second inlet conduits, respectively, and first and second electrical output leads, respectively, said first titrator inlet conduit being connected from said first means outlet conduit to receive a second portion of said fluid sample, said first titrator producing an electrical output signal on said first lead thereof of a magnitude directly proportional to the sum of the concentrations of hydrogen sulfide and sulfur dioxide in said sample fluid, respectively, said second titrator inlet conduit being connected from said scrubber outlet conduit to receive the fluid which passes through said scrubber outlet conduit, said second titrator producing an electrical output signal on said second output lead thereof of a magnitude directly proportional to the concentration of hydrogen sulfide but not that of sulfur dioxide in said sample fluid; and second means connected from said first and second output leads of said first and second titrators, respectively, connected to said flow confining apparatus at a location upstream of the connection of said first means therewith, and responsive to said titrator output signals and the magnitudes thereof for introducing oxygen in pure form or in a fluid mixture into said fluid confining apparatus at a variable flow rate and at a temperature to oxidize hydrogen sulfide therein; flow of fluid in said flow confining apparatus, said first means, said scrubber, said first and second titrators, and said second means each forming a link in a closed loop null seeking servo-mechanism in which said second means is actuable to vary or maintain constant said oxygen flow rate in a manner to drive the magnitudes of the output signals of said titrators to values indicating that there are concentrations larger than zero of both hydrogen sulfide and sulfur dioxide in said sample fluid and values indicating that the concentration of sulfur dioxide in said sample fluid times the molecular ratio 34/64 is approximately one-half the concentration of hydrogen sulfide in said sample fluid.

23. The invention as defined in claim 22, wherein a coalescer is connected with said flow confining apparatus downstream of the location at which said second means is connected therewith to form and to extract elemental sulfur from hydrogen sulfide (H₂S) and sulfur dioxide (SO₂) in said fluid in accordance with the chemical equation:

where H, S and O are symbols for the hydrogen, sulfur and oxygen atoms, respectively.

24. The invention as defined in claim 23, wherein said first means is connected to said flow confining apparatus at a location downstream of the location at which said coalescer is connected thereto.

25. The invention as defined in claim 24, wherein said second means includes a controller connected from both of said titrator output leads, a furnace closed except for first and second inlets and an outlet, said first furnace inlet being adapted for connection from said flow confining means upstream of the respective locations at which said coalescer and said first means are connected with said flow confining apparatus, said furnace outlet being connected back to said flow confining apparatus at a predetermined location upstream of the respective locations at which said coalescer and said first means are connected with said flow confining apparatus, said second means including a source of a reaction fluiud all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of sulfur dioxide in said sample fluid times the molecular ratio 34/64 is approximately one-half as large as the concentration of hydrogen sulfide in said sample fluid.

26. The invention as defined in claim 25, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signals on the respective outpt leads thereof, and third means connected from said divider means output lead to said controller output device to vary said controller output device in a manner to drive said divider means output signal to an approximately constant predetermined magnitude, said subtractor output signal being directly proportional to the concentration of sulfur dioxide in said sample fluid, the output signal of said divider means being directly proportional to the product of first and second ratios, said first ratio being the ratio of the concentration of the sulfur dioxide in said sample fluid to the concentration of the hydrogen sulfide therein, said second ratio being the molecular ratio 34/64.

27. The invention as defined in claim 26, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means having an output device connected to said controller output device, and sixth means having an output lead to supply an output signal thereon of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider means output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

28. The invention as defined in claim 27, wherein said sixth means is adjustable to adjust the magnitude of the output signal thereof.

29. The invention as defined in claim 28, wherein said sixth means is manually adjustable.

30. The invention as defined in claim 29, wherein said divider means output signal is a D.C. output voltage directly proportional to said product of ratios, said fourth means including a differential amplifier having inverting and non-inverting input leads, and an output lead, a first resistor connected from said divider means output lead to said amplifier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different respective constant potentials, at least one of said conductor potentials having a polarity opposite that of said divider means D.C. output voltage, said wiper being connected to said third resistor second lead.

31. The invention as defined in claim 22, wherein said second means includes a controller connected from both of said titrator output leads, a furnace closed except for first and second inlets and an outlet, said first furnace inlet being adapted for connection from said flow confining means upstream of the location at which said first means are connected with said flow confining apparatus, said furnace outlet being connected back to said flow confining apparatus at a predetermined location upstream of the location at which said first means are connected with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furance through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of sulfur dioxide in said sample fluid times the molecular ratio 34/64 is approximately one-half as large as the concentation of hydrogen sulfide in said sample fluid.

32. The invention as defined in claim 31, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signals on the respective output leads thereof, and third means connected from said divider means output leads to said controller output device to vary said controller output device in a manner to drive said divider means output signal to an approximately constant predetermined magnitude, said subtractor outut signal being directly proportional to the concentration of sulfur dioxide in said sample fluid, the output signal of said divider means being directly proportional to the product of first and second ratios, said first ratio being the ratio of the concentration of the sulfur dioxide in said sample fluid to the concentration of the hydrogen sulfide therein, said second ratio being the molecular ratio 34/64.

33. The invention as defined in claim 32, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means having an output device connected to said controller output device, and sixth means having an output lead to supply an output signal thereon of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

34. The invention as defined in claim 33, wherein said sixth means is adjustable to adjust the magnitude of the output signal thereof.

35. The invention as defined in claim 24, wherein said sixth means is manually adjustable.

36. The invention as defined in claim 35, wherein said divider means output signal is a D.C. output voltage directly proportional to said product of ratios, said fourth means including a differential amplifier having inverting and non-inverting input leads, and an output lead, a first resistor connected from said divider output lead to said amplfier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different respective constant potentials, at least one of said conductor potentials having a polarity opposite that of said divider D.c. output voltage, said wiper being connected to said third resistor second lead.

37. The invention as defined in claim 22, wherein said second means includes a controller connected from both of said titrator output leads, a furnace closed except for first and second inlets and an outlet, said first furnace inlet being adapted for connection from said flow confining means upstream of the respective locations at which said coalescer and said first means are connected with said flow confining apparatus, said furnace outlet being connected back to said flow confining apparatus at a predetermined location upstream of the respective locations at which said coalescer and said first means are connected with said flow confining apparatus, said second means including a source of reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of sulfur dioxide in said sample fluid times the molecular ratio 34/64 is approximately one-half as large as the concentration of hydrogen sulfide in said sample fluid.

38. The invention as defined in claim 37, wherein said controller includes a subtractor and a divider means each having first and second input leads, and an output lead, said subtractor first input lead being connected from said first titrator first output lead, said subtractor second input lead being connected from said second titrator second output lead, said divider means first input lead being connected from said subtractor output lead, said divider means second input lead being connected from said second titrator second output lead, said subtractor and said divider means being constructed to produce output signal on the respective output leads thereof, and third means connected from said divider means output lead to said controller output device to vary said controller output device in a manner to drive said divider means output signal to an approximately constant predetermined magnitude, said subtractor output signal being directly proportional to the concentration of sulfur dioxide in said sample fluid, the output signal of said divider means being directly proportional to the product of first and second ratios, said first ratio being the ratio of the concentration of the sulfur dioxide in said sample fluid to the concentration of the hydrogen sulfide therein, said second ratio being the molecular ratio 34/64.

39. The invention as defined in claim 38, wherein said third means includes fourth and fifth means connected in succession in that order from said divider means output lead to said controller output device, said fourth means having an output lead, said fourth means having first and second input leads, said fifth means having an input lead, said fourth means first input lead being connected from said divider output lead, said fourth means output lead being connected to said fifth means input lead, said fifth means having an output device connected to said controller output device, and sixth means having an output lead to supply an output signal thereof of an approximately constant magnitude, said sixth means output lead being connected to said fourth means second input lead, said fifth means being constructed to vary said output device thereof in a manner to drive the output of said fourth means to an approximately constant predetermined magnitude indicating that the algebraic sum of the magnitude of said divider means output signal and the magnitude of a signal directly proportional to said sixth means output signal is equal to zero, said fourth means being constructed to produce an output signal on said output lead thereof directly proportional to the algebraic sum of said divider means output signal and the magnitude of a signal directly proportional to said sixth means output signal.

40. The invention as defined in claim 39, wherein said sixth means is adjustable to adjust the magnitude of the output signal thereof.

41. The invention as defined in claim 40, wherein said sixth means is manually adjustable.

42. The invention as defined in claim 41, wherein said divider means output signal is a D.C. output voltage directly proportional to said product of ratios, said fourth means including a differential amplifier having inverting and non-inverting input leads, and an output lead, a first resistor connected from said divider means output lead to said amplifier inverting input lead, a second resistor connected between said amplifier inverting input lead and said amplifier output lead, said amplifier output lead being connected to said fifth means input lead, said amplifier non-inverting input lead being connected to a point of fixed reference potential, a third resistor having first and second leads, said third resistor first lead being connected to said amplifier inverting input lead, said sixth means including a potentiometer having a winding with first and second leads, and a wiper slidably movable in engagement with said winding, said winding leads being adapted for connection to conductors of different respective constant potentials, at least one of said conductor potentials having a polarity opposite that of said divider means D.C. output voltage, said wiper being connected to said third resistor second lead.

* * * * *